(12) United States Patent
Chikaraishi

(10) Patent No.: US 7,410,028 B2
(45) Date of Patent: Aug. 12, 2008

(54) STEERING CONTROL DEVICE

(75) Inventor: Kazuo Chikaraishi, Gunma (JP)

(73) Assignee: NSK Ltd., Tokyo (JP)

( * ) Notice: Subject to any disclaimer, the term of this patent is extended or adjusted under 35 U.S.C. 154(b) by 381 days.

(21) Appl. No.: 10/542,062

(22) PCT Filed: Dec. 24, 2003

(86) PCT No.: PCT/JP03/16576

§ 371 (c)(1), (2), (4) Date: Jul. 11, 2005

(87) PCT Pub. No.: WO2004/062983

PCT Pub. Date: Jul. 29, 2004

(65) Prior Publication Data

US 2006/0081409 A1    Apr. 20, 2006

(30) Foreign Application Priority Data

Jan. 10, 2003    (JP) .............................. 2003-003829

(51) Int. Cl.
*B62D 5/00* (2006.01)
(52) U.S. Cl. ...................... 180/402; 180/444
(58) Field of Classification Search .................. 180/402, 180/444, 446
See application file for complete search history.

(56) References Cited

U.S. PATENT DOCUMENTS

| | | | |
|---|---|---|---|
| 5,386,879 A * | 2/1995 | Shimizu .................... | 180/400 |
| 6,155,377 A * | 12/2000 | Tokunaga et al. ........... | 180/446 |
| 6,367,577 B2 * | 4/2002 | Murata et al. .............. | 180/446 |
| 6,561,306 B2 * | 5/2003 | Watanabe et al. .......... | 180/444 |
| 2002/0144855 A1 | 10/2002 | Zheng et al. | |

FOREIGN PATENT DOCUMENTS

| | | |
|---|---|---|
| JP | 10-194152 A | 7/1998 |
| JP | 2814375 B2 | 8/1998 |
| JP | 2000-16316 A | 1/2000 |

(Continued)

OTHER PUBLICATIONS

European Search Report as mailed Oct. 13, 2006.

*Primary Examiner*—Lesley D. Morris
*Assistant Examiner*—Marc A Scharich
(74) *Attorney, Agent, or Firm*—Sughrue Mion, PLLC

(57) ABSTRACT

A steering control apparatus in which a steering shaft coupled to a steering wheel is mechanically separated from a turning mechanism to turn a turning wheel, a steering angle of the steering wheel is detected, and the turning mechanism turns the turning wheel by a turning angle corresponding to the steering angle, includes a hypercycloidal mechanism including an external tooth gear revolving in a housing according to rotation of the steering wheel, an Oldham coupling mechanism to extract only a self-rotating movement in a rotation movement of the external tooth gear as a self-rotating movement of a rotation disk, and a rotation regulating mechanism by engagement between a groove formed in the rotation disk and a projection projecting from the housing. Then, a compact mechanical steering angle regulating mechanism is provided in which an allowable rotation range of the steering wheel is made ±180 degrees or more, and a low output and low capacity motor is used, and reduction in size and in cost of the apparatus is realized.

13 Claims, 8 Drawing Sheets

FOREIGN PATENT DOCUMENTS

| | | |
|---|---|---|
| JP | 2000-344117 A | 12/2000 |
| JP | 2001-114123 A | 4/2001 |
| JP | 2001-130426 A | 5/2001 |
| JP | 2001-171543 A | 6/2001 |
| JP | 2003-276630 A | 10/2003 |

* cited by examiner

STEERING CONTROL DEVICE

BACKGROUND OF THE INVENTION

1. Technical Field

The present invention relates to an improvement of a steering control apparatus which electrically controls steering of a steering wheel by using an electric motor.

2. Prior Art

In recent years, a steering control apparatus is proposed in which a steering shaft coupled to a steering wheel is mechanically separated from a turning mechanism to turn a turning wheel, and the interlocking control of these is electrically performed by SBW (Steer By Wire) control (hereinafter referred to as SBW control).

In this steering control apparatus, an operation direction and a steering angle of the steering wheel are detected, a turning angle corresponding to the steering angle in the operation direction is given, and steering corresponding to the operation of the steering wheel is performed.

At that time, an electric motor is driven according to the operation amount of the steering wheel, turning force of a turning actuator, lateral force generated in a vehicle, yaw rate, and the like, and the steering force is transmitted to the steering shaft through a speed reducer.

Besides, the steering force includes, in addition to a normal steering auxiliary force, a steering reaction force to stop the rotation of the steering wheel in the case where the turning actuator is put in the maximum turning position.

In the SBW control, since the steering reaction force is generated by the electric motor, when the turning actuator is put in the maximum turning position, it has been difficult to prevent the rotation of the steering wheel by the electric motor.

For example, when a lock state occurs, a large output motor is required in order to generate the steering reaction force against the steering torque by the driver, and since a large current flows through the motor, there has been a fear that the motor is burnt by overheating. However, when current is limited in order to prevent the burning of the motor, a torque necessary for the steering assist motor is not obtained, and it has been impossible to restrict the excessive steering of the driver.

Then, in order to regulate the rotation of the steering wheel within a restriction range of a certain fixed allowable angle, some sort of mechanical braking means has been required.

Incidentally, in the case where the rotation of the steering wheel is made ±180 degrees or less, when a projection provided on a rotation shaft is brought into contact with a projection provided on a fixing member such as a housing, the rotation of the steering wheel can be regulated within a certain allowable rotation range. However, since the allowable rotation range of a normal steering wheel is approximately 3 to 4 turns, when the allowable rotation range is made ±180 degrees or less, a tire turning angle relative to a rotation angle of the steering wheel becomes excessively large. As a result, there has been a problem that the behavior of the vehicle becomes sensitive and steering stability is impaired.

Thus, as set forth in, for example, JP-A-2000-16316, means for setting a rotation limit angle of a steering wheel is disclosed in which a first projection provided at a steering shaft, a second projection provided at a steering shaft housing, a third projection and a fourth projection engageable with the first projection are provided to realize rotatable support around the steering shaft over 360 degrees or more.

SUMMARY OF THE INVENTION

An object of the invention is to provide a compact mechanical steering angle regulating mechanism in which an allowable rotation range of a steering wheel is made ±180 degrees or more by a means different from the above conventional means, and a low output and low capacity motor is used, and to realize reduction in size and in cost of an apparatus.

The object of the invention is achieved by a steering control apparatus in which a steering shaft coupled to a steering wheel is mechanically separated from a turning mechanism to turn a turning wheel, a steering angle of the steering wheel is detected, and the turning mechanism turns the turning wheel by a turning angle corresponding to the steering angle, and which includes a hypercycloidal mechanism including an external tooth gear revolving in a housing according to rotation of the steering wheel while engaging with an internal tooth gear, an Oldham coupling mechanism to extract only a self-rotating movement of the external tooth gear as a self-rotating movement of a rotation disk, and a rotation regulating mechanism by engagement between a groove formed in the rotation disk and a projection projecting from the housing.

Besides, the object is achieved by assembling the hypercycloidal mechanism from the external tooth gear rotatably provided through a bearing on an outer periphery of an eccentric disk fitted to a rotation shaft coupled to the steering wheel, and the internal tooth gear formed in the housing, and by constructing it by engagement between the internal tooth gear and the external tooth gear.

Besides, the object is achieved by assembling the Oldham coupling mechanism from the external tooth gear, the rotation disk, and a relay member intervening between the rotation disk and the external tooth gear.

Besides, the object is achieved by constructing the rotation regulating mechanism by engagement between the groove formed in the rotation disk and the projection projecting from a housing of the speed reducer.

Besides, the object is achieved by disposing, in the rotation regulating mechanism, an elastic body between the groove formed in the rotation disk and the projection projecting from the housing.

Besides, the object is achieved by disposing a speed reducer of a motor to the steering shaft coupled to the steering wheel, by disposing an angle-torque sensor which includes an angle sensor being adjacent to the speed reducer and for detecting a relative angle between two shafts coupled by a torsion bar, and a torque sensor to detect a torque based on a detection result from the angle sensor, and by assembling a reaction force imparting mechanism from the angle-torque sensor, the motor and the speed reducer.

Besides, the object is achieved by detachably attaching the steering control apparatus to an output shaft of the speed reducer.

Besides, the object is achieved by forming a conical taper surface at an end of the output shaft of the speed reducer, forming a spline along an axial direction, inserting the steering control apparatus along the spline and the conical taper surface, and fixing it by a screw.

Besides, the object is achieved by providing on the rotation disk a potentiometer for detecting a rotation angle of the rotation disk.

Besides, the object is achieved by providing the potentiometer between the housings of the speed reducer and the steering control apparatus.

Besides, the object is achieved by including an angle sensor disposed between the steering wheel and the speed reducer and for detecting a relative angle between two shafts coupled by a torsion bar, and a torque sensor to detect a torque based on a detection result from the angle sensor.

Besides, the object is achieved by restricting power application to the motor to a continuous rated current or less in a case where it is judged based on a detection result of the potentiometer that the rotation regulating mechanism is in a lock state.

DESCRIPTION OF REFERENCE NUMERALS AND SIGNS

Figure 1:
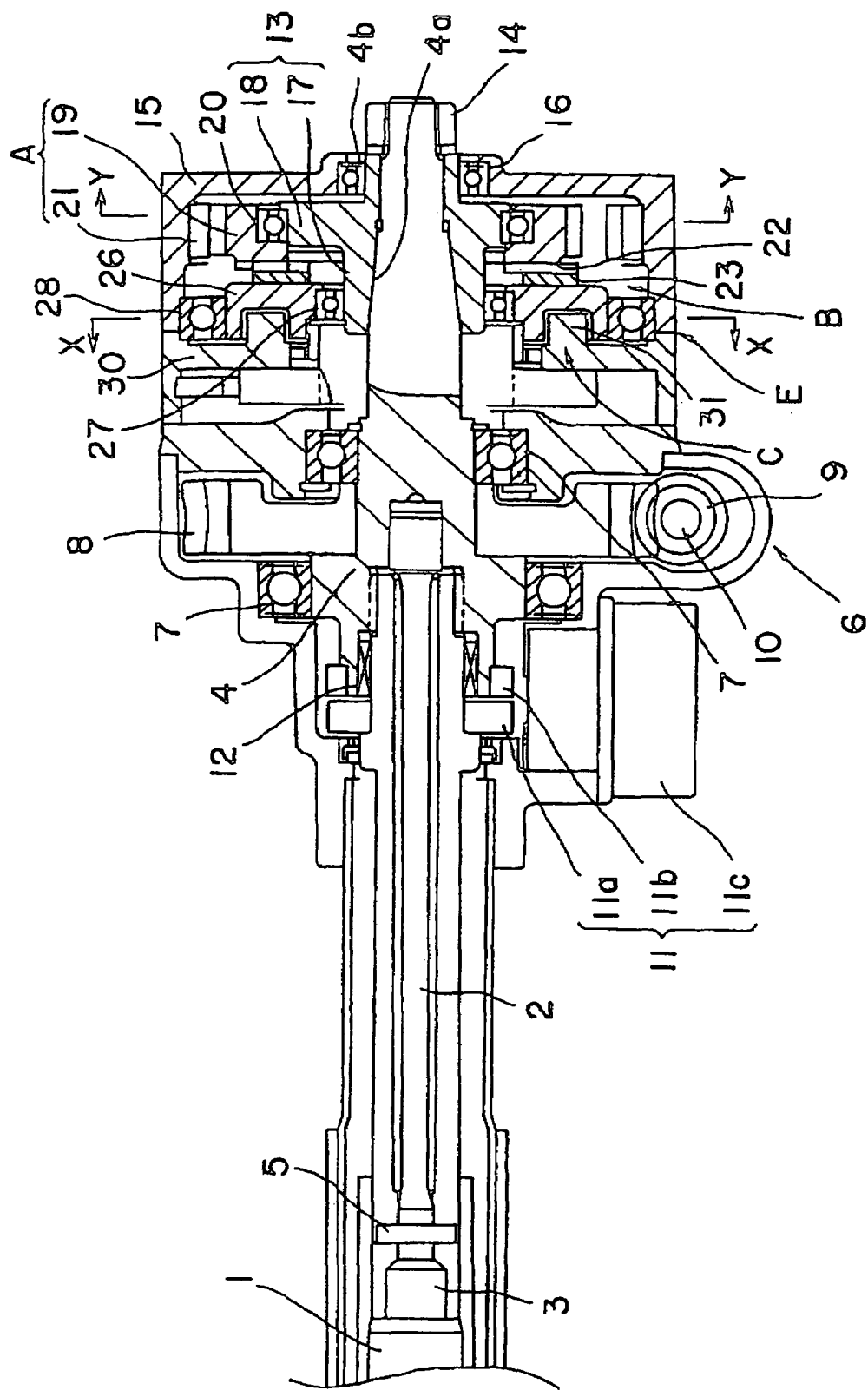
FIG. 1 is a sectional view showing a rough structure of a steering control apparatus according to a first embodiment of the invention.

A hypercycloidal mechanism
B Oldham coupling
1 steering shaft
3 input shaft
4 output shaft
4a taper surface
4b spline
6 speed reducer
11 angle-torque sensor
13 hub
15 housing
18 eccentric disk
19 external tooth gear
21 internal tooth gear
23 relay member
26 rotation disk
29 recess groove
30 tongue piece part
31 convex part
41 disk spring
51 housing
61 potentiometer
71 elastic body

DETAILED DESCRIPTION OF PREFERRED EMBODIMENTS

Hereinafter, embodiments of the invention will be described with reference to the drawings.

FIG. 1 shows a rough structure of a steering system according to a first embodiment of the invention, and an input shaft 3 and a substantially cylindrical output shaft 4 are coupled to an output end side of a steering shaft 1 through a torsion bar 2. One end of the torsion bar 2 is fixed to the input shaft 3 through a pin 5, and the other end is pressed in and fixed by the output shaft 4.

Besides, a speed reducer 6 is supported by a pair of ball bearings 7 and 7 at an outer periphery of the output shaft 4. The speed reducer 6 includes a worm wheel 8 pressed in and fixed by the outer periphery of the output shaft 4, a worm 9 engaging with the worm wheel 8, and a motor (not shown) in which the worm 9 is attached to a rotation shaft 10, and the drive force of the motor is reduced and transmitted to the output shaft 4 through the speed reducer 6.

An angle-torque sensor 11 is disposed at a steering wheel side (left in FIG. 1) of the speed reducer 6, and the angle-torque sensor 11 includes an angle sensor having a detection ring 11a disposed outside the torsion bar 2, a detection ring 11b, and a detector 11c for optically detecting rotation angles of the respective detection rings 11a and 11b, and a torque sensor to detect a torque based on a phase difference detected by the angle sensor. By this, a twist angle and a torque of the torsion bar 2 are detected by the angle-torque sensor 11, and a reaction force imparting mechanism is constructed which controls the twist of the torsion bar 2 through the speed reducer 6 by driving of the motor according to the rotation angle of the steering wheel. Incidentally, reference numeral 12 denotes a needle bearing to rotatably support the input shaft 3 and the output shaft 4.

Figure 2:
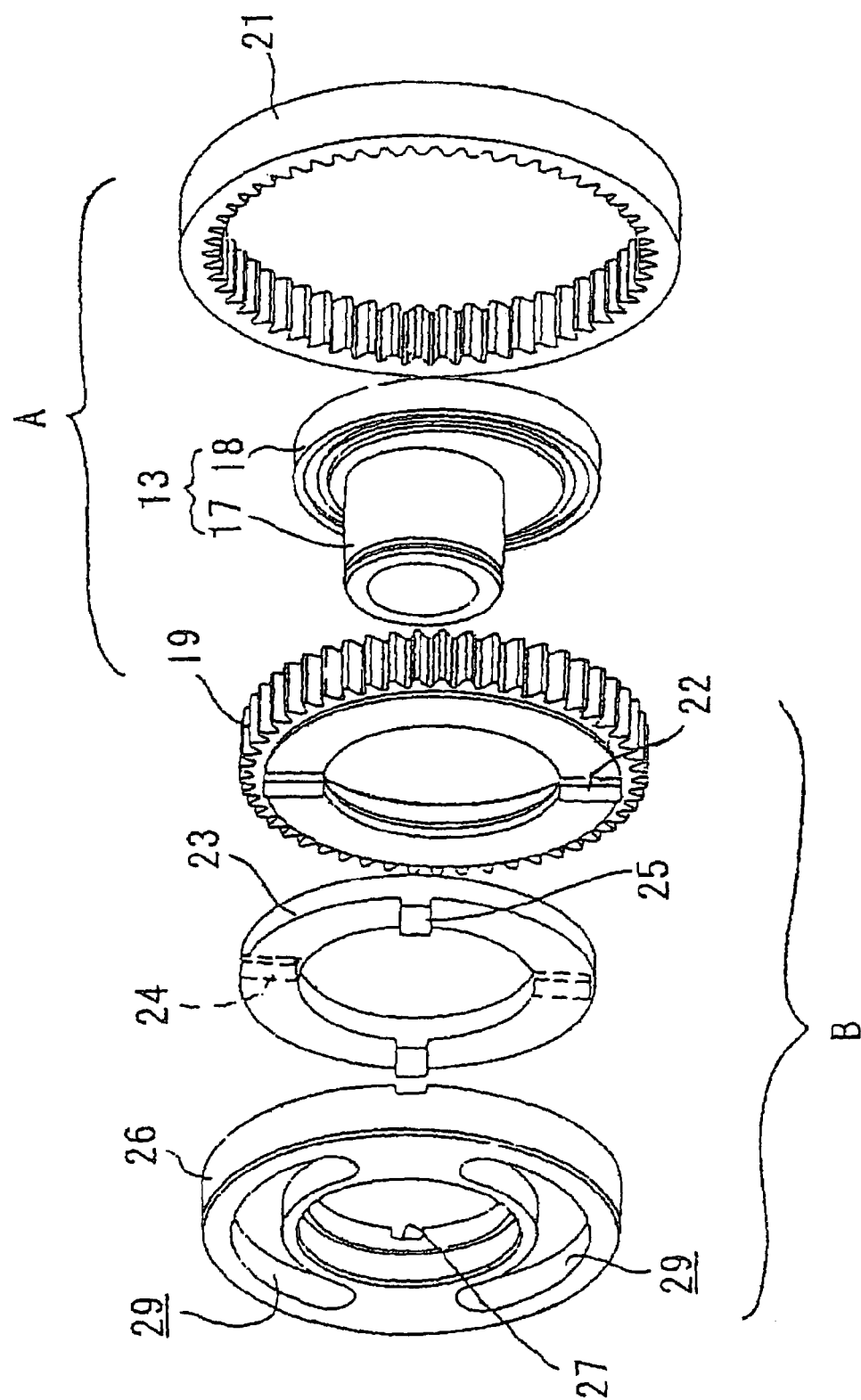
FIG. 2 is a perspective view showing main members constituting a rotation regulating device.

Besides, a taper surface 4a shrinking toward the end (right in FIG. 1) is formed on the output shaft 4, and plural splines 4b extend in the axial direction toward the end. A hub 13 as shown in FIG. 2 is fitted onto this end, and is integrally fixed to the output shaft 4 by a screw 14. The hub 13 is rotatably supported by a ball bearing 16 provided in a housing 15. The hub 13 includes a substantially cylindrical part 17, and a substantially annular eccentric disk 18 extending in a radial direction from the outer peripheral surface of the substantially cylindrical part 17. The eccentric disk 18 is attached in a state where it is eccentric to the axial center of the output shaft 4.

Figure 3:
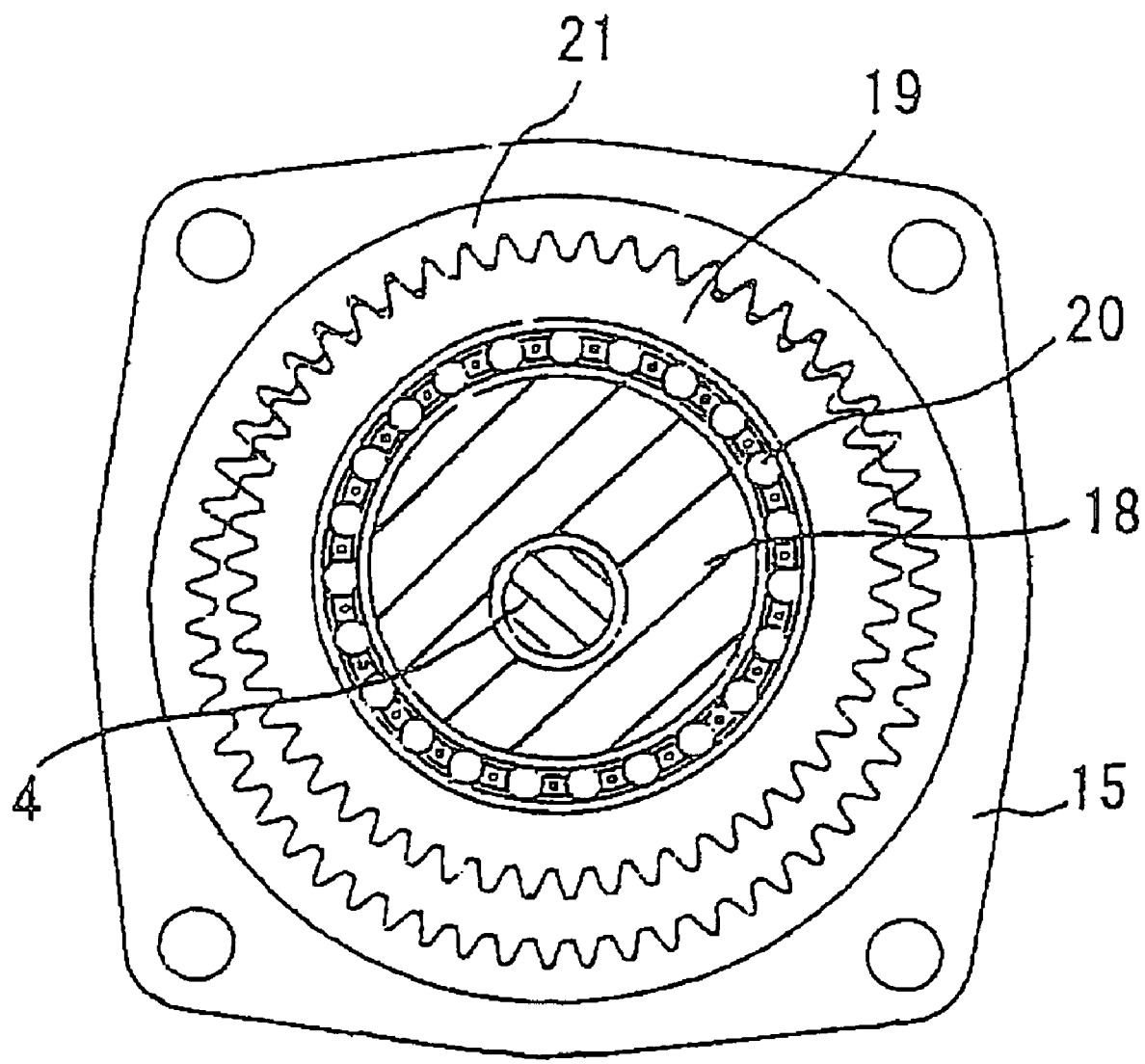
FIG. 3 is a sectional view taken along line X-X of FIG. 1.

Besides, as shown in FIG. 3, an external tooth gear 19 is attached to the outer periphery of the eccentric disk 18 through a ball bearing 20, and similarly to the eccentric disk 18, the external tooth gear 19 rotates around the output shaft 4 in a state where it is eccentric to the output shaft 4. On the other hand, in the housing 15, an internal tooth gear 21 is provided at a position opposite to the external tooth gear 19, and a hypercycloidal mechanism A is comprised of the engagement between the internal tooth gear 21 and the external tooth gear 19.

Besides, a projection 22 extending in a radial direction is formed at a side surface of the external tooth gear 19, and an annular relay member 23 is adjacently disposed at a steering wheel side (left in FIG. 1) of the external tooth gear 19. A groove 24 extending in a radial direction toward the end side (right in FIG. 1) is formed in the relay member 23, the projection 22 of the external tooth gear 19 is slidable in the groove 24 in the radial direction, and their relative rotation cannot be performed. Besides, at the steering wheel side (left in FIG. 1) of the relay member 23, a projection 25 extends in the radial direction orthogonal to the groove 24. On the other hand, at the end side (right in FIG. 1) of the rotation disk 26, an engagement groove 27 extending in the radial direction is formed, and the projection 25 of the relay member 23 is slidable in the engagement groove 27 and is engaged therewith so that their relative rotation cannot be performed. Further, at the steering wheel side (left in FIG. 1) of the relay member 23, the annular rotation disk 26 is rotatably supported by the hub 13 through a ball bearing 27. By this, the relay member 23 and the rotation disk 26 are integrally rotated, an Oldham coupling mechanism B is comprised of the outer tooth gear 19, the relay member 23, and the rotation disk 26, and the revolution movement of the outer tooth gear 19 is extracted as the self-rotating movement of the rotation disk 26.

The Oldham coupling mechanism B is positioned at a predetermined position in the axial direction by the ball bearings 20 and 27. The rotation disk 26 can be moved in the axial direction through a ball bearing 28 disposed in the housing 15, and allows a position shift between the housing 15 and the hub 13. Here, the housing 15 is assembled as an inlaid part at the outer peripheral side of the ball bearing 28 supporting the rotation disk 26, its end side can be removed while point E in FIG. 1 is made the boundary, and the housing 15 is halved in the axial direction.

Figure 4:
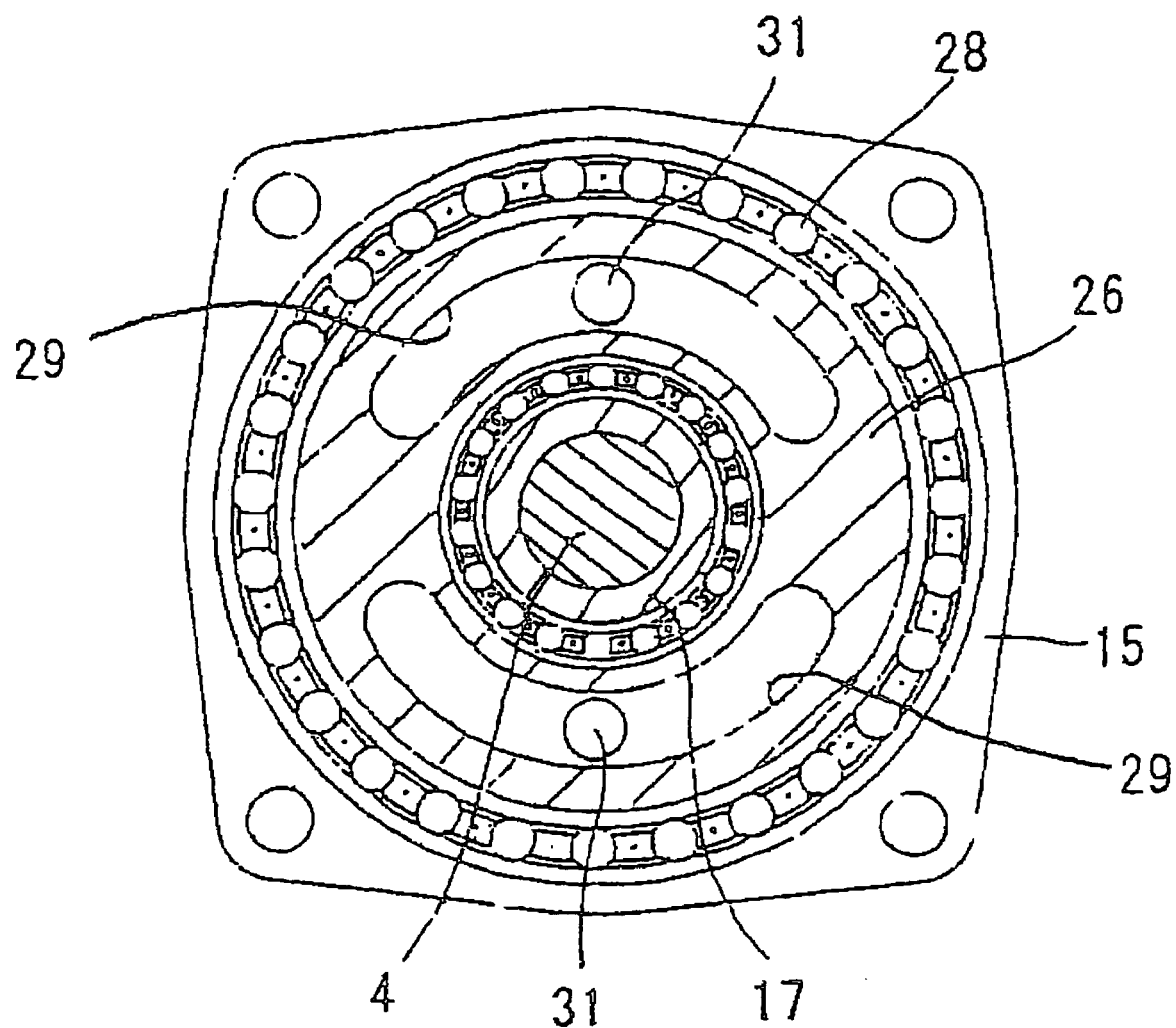
FIG. 4 is sectional view taken along line Y-Y of FIG. 1.

As shown in FIG. 4, a pair of grooves 29 in the peripheral direction are formed at the steering wheel side (left in FIG. 1) in the rotation disk 26. On the other hand, an annular tongue piece part 30 extending inward is formed in the housing 15, and a convex part 31 extends toward the end side (right in FIG. 1) from the tongue piece part 30. By this, the rotation of the rotation disk 26 is regulated within a predetermined range by the engagement between the recess groove 29 and the convex part 31, and a rotation regulating mechanism C functioning as a stopper of rotation angle regulation is formed.

Incidentally, in the first embodiment, the recess groove 29 is provided at the rotation disk 26 side, and the convex part 31 is provided at the housing 15 side. However, a convex part may be provided at the rotation disk 26 side and a recess groove may be provided at the housing 15 side, and the same function and effects as the first embodiment can be obtained.

Besides, the internal tooth gear 21 may be formed as a single body and attached to the housing 15, or may be formed integrally with the housing 15.

Accordingly, in the first embodiment, the rotation regulating mechanism C to regulate the rotation angle of the steering wheel is provided between the rotation disk 26 rotating according to the steering of the steering wheel and the housing 15. That is, the allowable rotation range of the rotation disk 26 is regulated by the engagement between the recess groove 29 formed in the rotation disk 26 and the convex part 31 projecting from the housing 15, so that the allowable rotation range of the steering wheel is regulated. Thus, the eccentric disk 18 is provided on the output shaft 4 coupled to the steering wheel, the external tooth gear 19 is supported on the outer periphery of the eccentric disk 18 through the bearing 20, and the hypercycloidal mechanism A is comprised of the external tooth gear 19 and the internal tooth gear 21 fixed to the housing 15. That is, the rotation of the steering wheel is inputted as the revolution movement of the external tooth gear 19 to the hypercycloidal mechanism A, and when the external gear 19 revolves while engaging with the internal tooth gear 21, the external tooth gear 19 rotates on its own axis at a predetermined speed reduction ratio. Here, the predetermined speed reduction ratio is $Z1/(Z2-Z1)$, where $Z1$ denotes the number of teeth of the internal tooth gear and $Z2$ denotes the number of teeth of the external tooth gear. For example, when $Z1$ is 45 and $Z2$ is 52, the speed reduction ratio is about 6.4.

The rotation disk 26, together with the external tooth gear 19 through the relay member 23, constitutes the Oldham coupling mechanism B, and only the self-rotating movement is extracted as the rotation of the rotation disk 26 from the revolution movement of the external tooth gear 19. By this, the rotation regulating mechanism C is constructed in which the rotation of the rotation disk 26 is regulated by the engagement between the recess groove 29 of the rotation disk 26 and the convex part 31 of the housing 15, and the rotation of the steering wheel is regulated.

Thus, in the first embodiment, the rotation of the steering wheel is reduced by the hypercycloidal mechanism A, only the self-rotating movement of the external tooth gear 19 is extracted as the rotation of the rotation disk 26 by the Oldham coupling mechanism B, and the allowable rotation range of the steering wheel is regulated by the rotation regulating mechanism C. As a result, the allowable rotation range of the steering wheel can be made ±180 degrees or more by the mechanical regulating mechanism of the steering angle, and reduction in size and cost of the apparatus can be realized.

Next, a second embodiment of the invention will be described.

Figure 5:
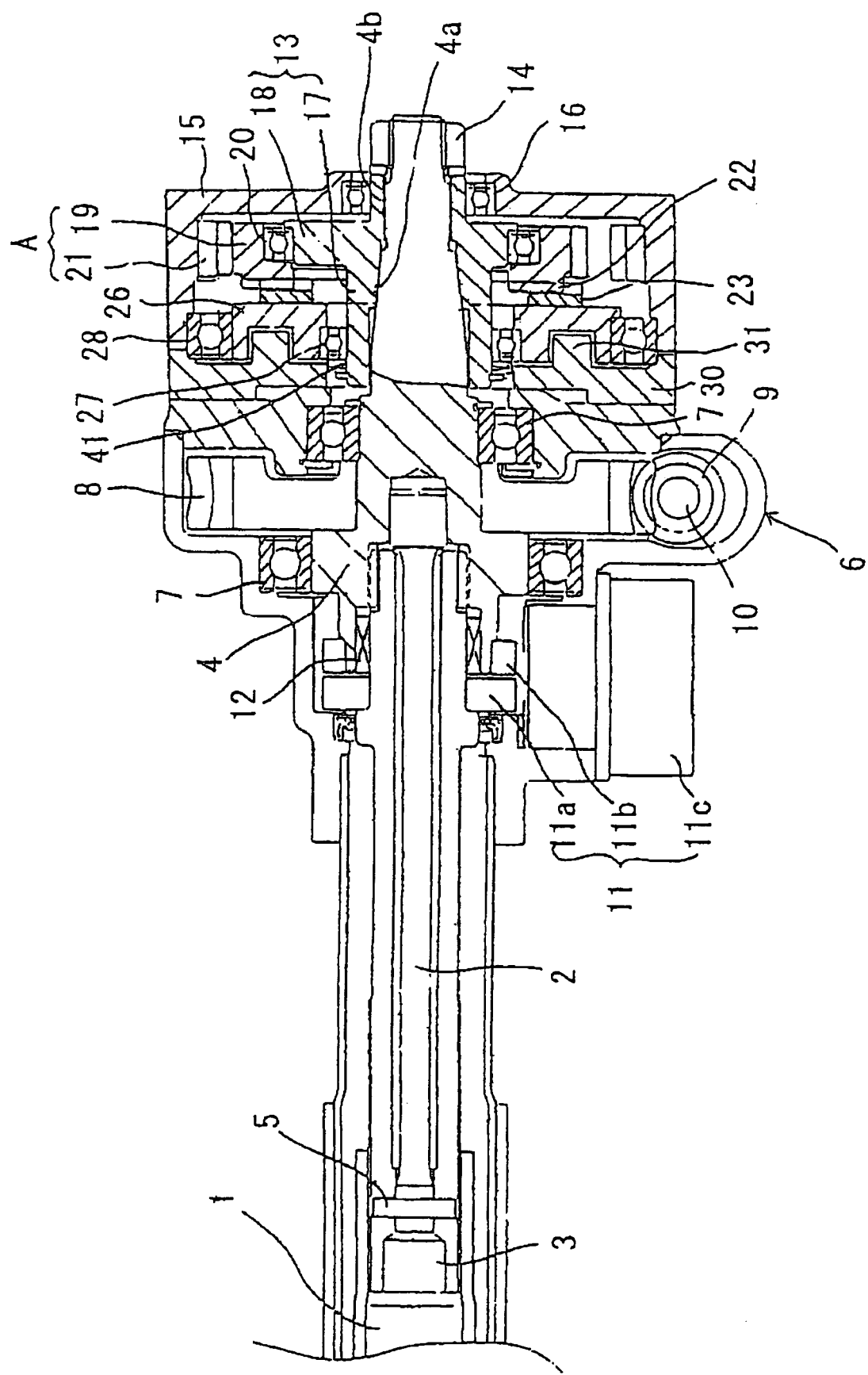
FIG. 5 is a sectional view showing a rough structure of a steering control apparatus according to a second embodiment of the invention.

FIG. 5 shows a rough structure of a steering system according to the second embodiment of the invention, and the same members as the first embodiment are denoted by the same reference characters and their explanation will be omitted. In the drawing, a hub 13 is fitted onto an end of an output shaft 4 coupled to a steering wheel. The hub 13 positions an Oldham coupling mechanism B by a pair of ball bearings 20 and 27.

A disk spring 41 as an elastic body to urge toward the end side (right in FIG. 5) is wound around the ball bearing 27 disposed at the output shaft 4, the ball bearing 27 is pressed to the end side (right in FIG. 5) by this disk spring 41, and working torque to the positioning of the Oldham coupling mechanism B is made certain.

In general, in the steering control apparatus, since mechanical coupling is not made from a steering wheel to a turning wheel (tire), when friction acting on the Oldham coupling mechanism B is small, there has been a fear that even when a slight force is applied to the steering wheel, the steering wheel is rotated, the turning wheel wobbles, and straight stability is degraded. Then, suitable friction is given to the respective engagement parts of the Oldham coupling mechanism B by the disk spring 41, so that the control of the steering control apparatus is made certain, and the steering stability can be improved.

Next, a third embodiment of the invention will be described.

Figure 6:
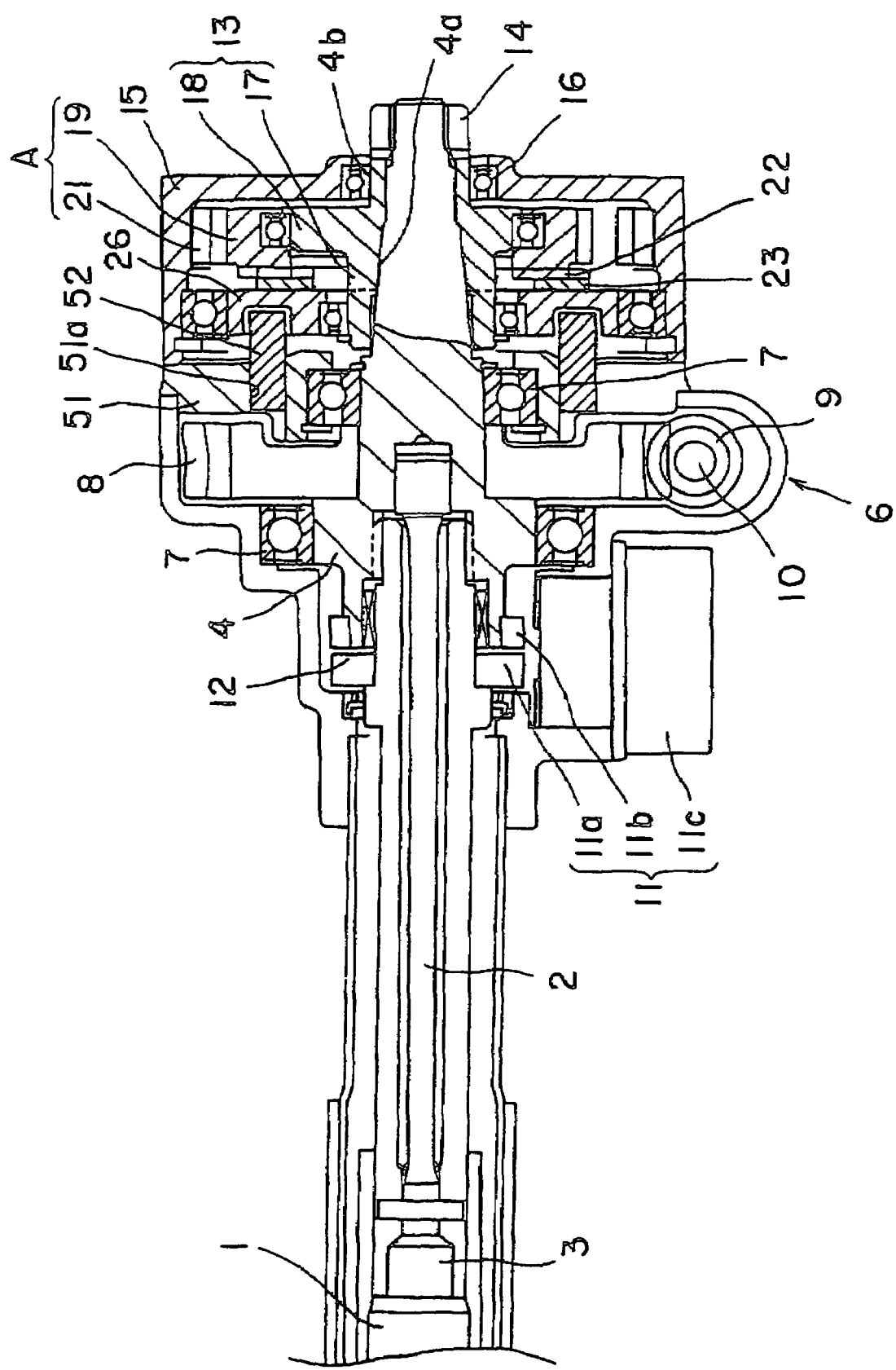
FIG. 6 is a sectional view showing a rough structure of a steering control apparatus according to a third embodiment of the invention.

FIG. 6 shows a rough structure of a steering system according to the third embodiment, and the same members as the first embodiment are denoted by the same reference characters and their explanation will be omitted. In the drawing, a fitting hole 51a is formed in a housing 51 of a reaction force imparting mechanism, and a projection 52 extending toward the end side (right in FIG. 6) is fitted to the fitting hole 51a. The projection 52 is engaged with a recess groove 29 of a rotation disk 26 extending in the peripheral direction within a predetermined rotation range, and a rotation regulating mechanism C to regulate the rotation of the rotation disk 26 is comprised of the engagement between the projection 52 and the recess groove 29.

By this, in the third embodiment, like the first and the second embodiments, an end face of a housing 15 of the rotation regulating mechanism C at a steering wheel side can be eliminated, and the same function and effects as the first embodiment can be realized.

Next, a fourth embodiment of the invention will be described.

Figure 7:
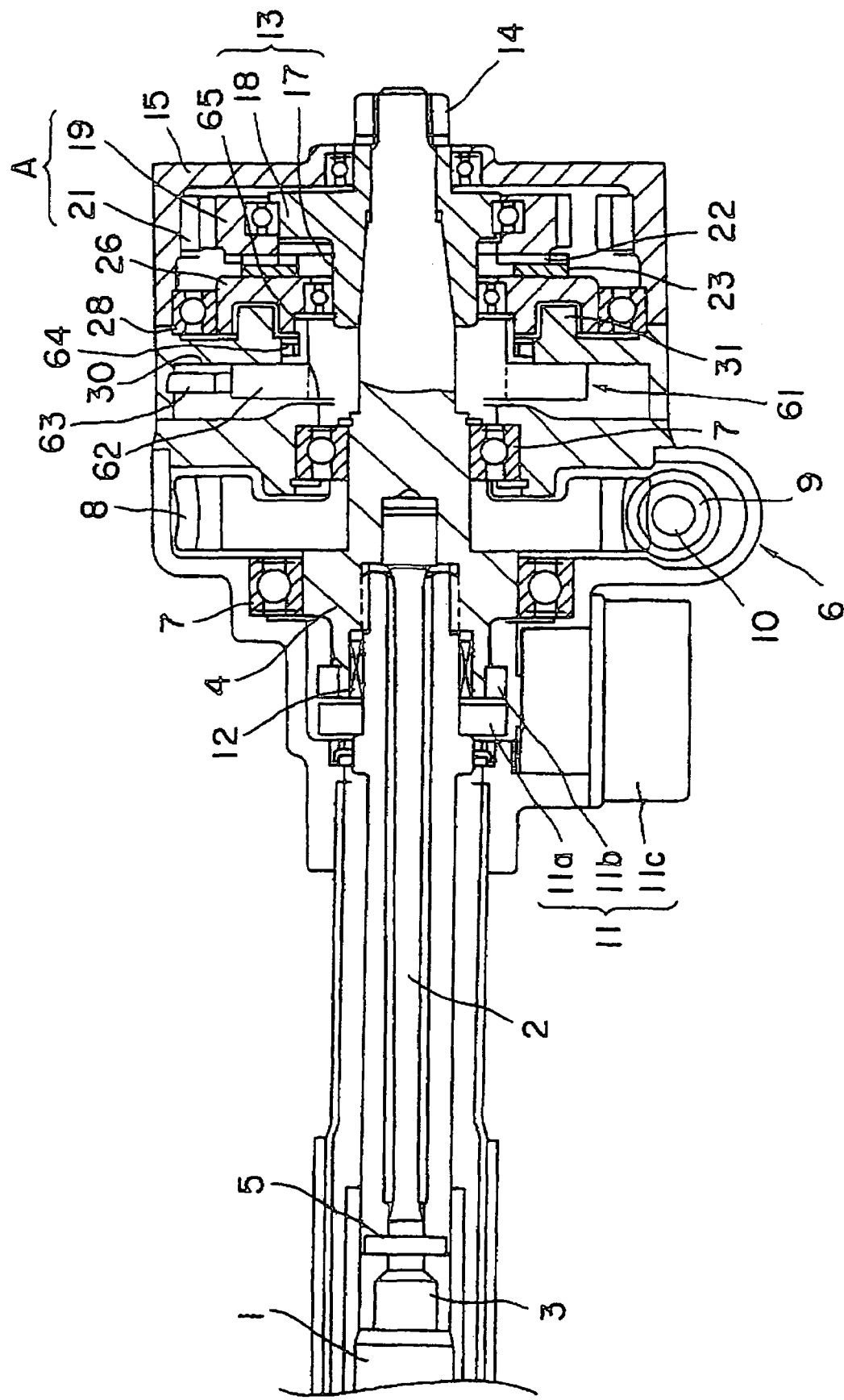
FIG. 7 is a sectional view showing a rough structure of a steering control apparatus according to a fourth embodiment of the invention.

FIG. 7 shows a rough structure of a steering system according to the fourth embodiment of the invention, and the same members as the first embodiment are denoted by the same reference characters, and their description will be omitted. A pair of peripheral direction grooves 29 are formed in a rotation disk 26 at a steering wheel side (left in FIG. 7), and a convex part 31 of a tongue piece part 30 of a housing 15 extends toward an end side (right in FIG. 7).

A housing 62 for housing a rotation potentiometer 61 is disposed at the outside of an output shaft 4 and between a housing of a reaction force imparting mechanism and the housing 15 of a steering control apparatus, and as a detection sensor of an absolute angle of a steering shaft 1, it detects the rotation amount of the rotation disk 26. Incidentally, reference numeral 63 denotes an introduction pipe of a lead wire connected to the potentiometer 61; 64, a bearing bush; and 65, an engagement part to the rotation disk 26.

That is, like a conventional steering apparatus, in the case where a tire and a steering wheel are mechanically coupled, a straight running state is judged and a neutral position can be corrected. However, in the case of the SBW control, since there is no mechanical coupling, there has been a possibility that when positions of a tire and a steering wheel are shifted, and are shifted by one rotation, left and right allowable rotation angles become uneven. Then, in the fourth embodiment, the potentiometer 61 is used as the detection sensor of the absolute angle, so that the absolute position detection can be easily performed.

Incidentally, in the case where a structure is made to have three angle sensors in total, that is, an angle sensor and two angle sensors for torque detection, and trouble of an angle sensor is detected, when the number of sensors is two, it is impossible to judge which is abnormal, and therefore, it has been necessary to judge the trouble by providing three sensors and by mutual comparison of detection values.

Next, a fifth embodiment of the invention will be described.

Figure 8:
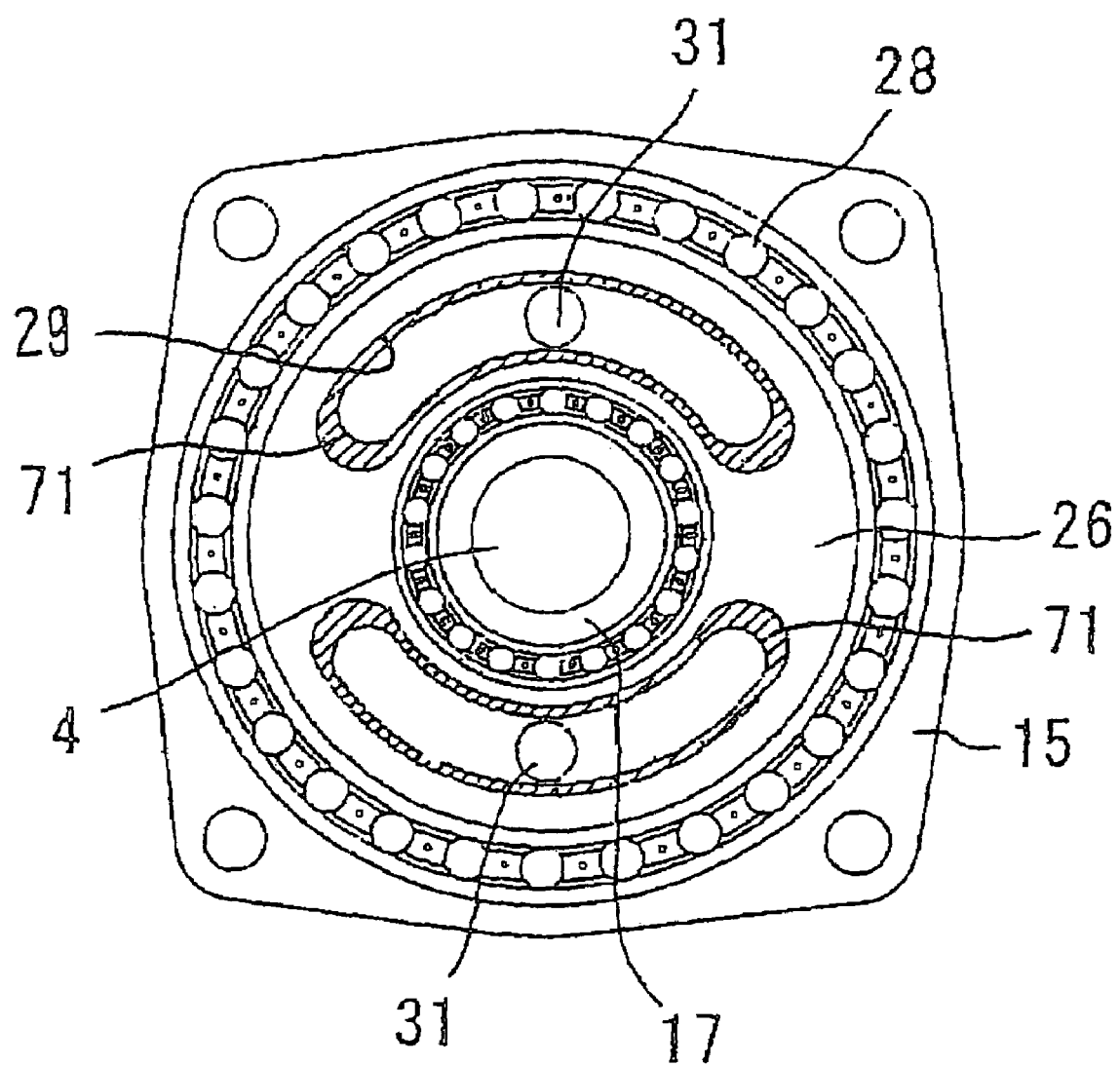
FIG. 8 is a view explaining a rough structure of a rotation regulating mechanism of a steering control apparatus according to a fifth embodiment of the invention.

FIG. 8 shows a rough structure of a steering system according to the fifth embodiment of the invention, and the same members as the first embodiment are denoted by the same reference characters and their explanation will be omitted. In the drawing, a pair of peripheral direction grooves 29 are formed at a steering wheel side (left in FIG. 1) in a rotation disk 26. On the other hand, an annular tongue piece part 30 extending inward is formed in a housing 15, and a convex part 31 extends toward an end side from the tongue piece part 30.

An elastic body 71 made of synthetic resin, rubber or the like is interposed between the recess groove 29 of the rotation disk 26 and the convex part 31 of the housing 15. By this, a control can be performed such that rising of a rotation preventing torque at the time of rotation regulation becomes gentle.

As described above, a steering control apparatus of the invention is a steering control apparatus in which a steering shaft coupled to a steering wheel is mechanically separated from a turning mechanism to turn a turning wheel, a steering angle of the steering wheel is detected, and the turning mechanism turns the turning wheel by a turning angle corresponding to the steering angle, and which includes a hypercycloidal mechanism including an external tooth gear revolving in a housing according to rotation of the steering wheel, an Oldham coupling mechanism to extract only a self-rotating movement in a rotation movement of the external tooth gear as a self-rotating movement of a rotation disk, and a rotation regulating mechanism by engagement between a groove formed in the rotation disk and a projection projecting from the housing. By this, even if the allowable rotation range of the steering wheel is made ±180 degrees or more, the rotation of the steering wheel can be mechanically regulated by the rotation regulating mechanism of the steering angle. As a result, reduction in output and in capacity of a motor can be realized, and reduction in size and in cost of the apparatus can be achieved.

The invention claimed is:

1. A steering control apparatus in which steering of a steering wheel is electrically controlled by using an electric motor comprising:
    a steering shaft coupled to the steering wheel;
    a turning mechanism turning a turning wheel by a turning angle corresponding to a steering angle of the steering wheel;
    a hypercycloidal mechanism including an external tooth gear revolving in a housing according to rotation of the steering wheel,
    an Oldham coupling mechanism to extract a self-rotating movement of the external tooth gear as a self-rotating movement of a rotation disk; and
    a rotation regulating mechanism regulating the rotating movement of the rotation disk by engagement between a groove formed in the rotation disk and a projection projecting from the housing;
    wherein the steering shaft and the turning mechanism are separated mechanically by Steer By Wire control; and
    an interlocking of the steering shaft and the turning mechanism are electrically performed by the Steer By Wire control wherein an operation direction and a steering angle of the steering wheel are detected and the turning wheel is rotated at a turning angle corresponding to a steering angle in the operation direction.

2. The steering control apparatus according to claim 1, wherein the hypercycloidal mechanism includes the external tooth gear rotatably provided through a bearing on an outer periphery of an eccentric disk fitted to a rotation shaft coupled to the steering wheel, and an internal tooth gear formed in the housing, and is comprised of engagement between the internal tooth gear and the external tooth gear.

3. The steering control apparatus according to claim 1 or 2, wherein the Oldham coupling mechanism includes the external tooth gear, the rotation disk, and a relay member intervening between the rotation disk and the external tooth gear.

4. The steering control apparatus according to claim 2, wherein the rotation regulating mechanism is comprised of engagement between the groove formed in the rotation disk and the projection projecting from the housing.

5. The steering control apparatus according to claim 4, wherein the rotation regulating mechanism includes an elastic body between the groove formed in the rotation disk and the projection projecting from the housing.

6. The steering control apparatus according to claim 2, wherein a speed reducer of a motor is disposed to the steering shaft coupled to the steering wheel, an angle-torque sensor is disposed which includes an angle sensor being adjacent to the speed reducer and for detecting a relative angle between two shafts coupled by a torsion bar, and a torque sensor to detect a torque based on a detection result from the angle sensor, and a reaction force imparting mechanism includes the angle-torque sensor, the motor and the speed reducer.

7. The steering control apparatus according to claim 6, wherein the steering control apparatus is detachably attached to an output shaft of the speed reducer.

8. The steering control apparatus according to claim 7, wherein a conical taper surface is formed at an end of an output shaft of the speed reducer, a spline is formed along an axial direction, and the steering control apparatus is inserted along the spline and the conical taper surface and is fixed by a screw.

9. The steering control apparatus according to claim 6, wherein a potentiometer for detecting a rotation angle of the rotation disk is provided on the rotation disk.

10. The steering control apparatus according to claim 9, wherein the potentiometer is provided between the housings of the speed reducer and the steering control apparatus.

11. The steering control apparatus according to claim 9, further comprising an angle sensor disposed between the steering wheel and the speed reducer and for detecting a relative angle between two shafts coupled by a torsion bar, and a torque sensor to detect a torque based on a detection result from the angle sensor.

12. The steering control apparatus according to claim 9, wherein in a case where it is judged based on the detection result of the potentiometer that the rotation regulating mechanism is in a lock state, power application to the motor is restricted to a continuous rated current value or less.

13. The steering control apparatus according to claim 3, wherein the Oldham coupling mechanism extracts the self-rotating movement of the external tooth gear as the rotation of the rotation disk only from the revolution movement of the external tooth gear via the relay member intervening between the external tooth gear and the rotation disk.

* * * * *